US007469102B2

(12) United States Patent
Lee et al.

(10) Patent No.: US 7,469,102 B2
(45) Date of Patent: Dec. 23, 2008

(54) WAVELENGTH-DIVISION-MULTIPLEXING PASSIVE OPTICAL NETWORK UTILIZING FIBER FAULT DETECTORS AND/OR WAVELENGTH TRACKING COMPONENTS

(75) Inventors: Chang-Hee Lee, Taejon (KR); Kwang-Uk Chu, Taejon (KR)

(73) Assignee: Novera Optics, Inc., Santa Clara, CA (US)

( * ) Notice: Subject to any disclaimer, the term of this patent is extended or adjusted under 35 U.S.C. 154(b) by 543 days.

(21) Appl. No.: 10/530,445

(22) PCT Filed: Apr. 18, 2003

(86) PCT No.: PCT/US03/12054

§ 371 (c)(1),
(2), (4) Date: Apr. 5, 2005

(87) PCT Pub. No.: WO2004/034621

PCT Pub. Date: Apr. 22, 2004

(65) Prior Publication Data

US 2005/0286895 A1    Dec. 29, 2005

(30) Foreign Application Priority Data

Oct. 7, 2002    (KR)    ............... 10-2002-0060868

(51) Int. Cl.
*H04J 14/02*    (2006.01)

(52) U.S. Cl. ............... 398/79; 398/66; 398/67; 398/68; 398/70; 398/71; 398/72; 398/33; 398/31; 398/38; 398/177; 398/91; 398/93; 398/94; 398/95; 398/158; 398/156; 398/192; 398/195; 398/196; 398/197; 385/24; 385/37; 385/14; 385/15; 385/27; 372/32; 372/34; 372/36; 372/38.02

(58) Field of Classification Search ............... 398/33, 398/7, 34, 79, 82, 140, 141, 25, 26, 27, 70, 398/71, 72, 91, 93, 95, 94, 100, 156, 162, 398/136, 192, 195, 196, 197, 81, 66, 67, 398/68, 153, 158, 159, 163, 13, 14, 17, 20, 398/21, 31, 38, 177; 372/32, 34, 35, 36, 372/38.02; 385/24, 37, 15, 14, 27

See application file for complete search history.

(56) References Cited

U.S. PATENT DOCUMENTS 5,251,001 A    10/1993    Dave et al.

(Continued)

FOREIGN PATENT DOCUMENTS

EP    0 607 029 A2    7/1994

(Continued)

OTHER PUBLICATIONS

PCT Written Opinion for PCT Counterpart Application No. PCT/US03/12054, 6 pgs. (May 2, 2005).

(Continued)

*Primary Examiner*—Hanh Phan
(74) *Attorney, Agent, or Firm*—Blakely, Sokoloff, Taylor & Zafman LLP

(57) ABSTRACT

Various methods, systems, and apparatuses is described in which a passive-opticalnetwork includes a first multiplexer/demultiplexer, a second multiplexer/demultiplexer, a wavelength tracking component, and a transmission wavelength controller. The first multiplexer/demultiplexer is located in a first location. The second multiplexer/demultiplexer is located in a second location remote from the first location. The wavelength tracking component determines the difference between the transmission band of wavelengths of the first multiplexer/demultiplexer and the second multiplexer/demultiplexer to provide a control signal to match the transmission band of wavelengths of the first multiplexer/demultiplexer and the second multiplexer/demultiplexer. The transmission wavelength controller alters an operating parameter of the first multiplexer/demultiplexer based on the control signal to control the transmission band of wavelengths of the first multiplexer/demultiplexer.

31 Claims, 5 Drawing Sheets

U.S. PATENT DOCUMENTS

| | | | |
|---|---|---|---|
| 5,894,247 | A | 4/1999 | Yoshida et al. |
| 5,907,417 | A | 5/1999 | Darcie et al. |
| 5,920,414 | A | 7/1999 | Miyachi et al. |
| 6,304,350 | B1 * | 10/2001 | Doerr et al. ............... 398/9 |
| 6,323,994 | B1 | 11/2001 | Li et al. |
| 6,868,200 | B2 * | 3/2005 | Kimotsuki et al. ............ 385/24 |
| 2001/0013962 | A1 | 8/2001 | Li |
| 2003/0095736 | A1 * | 5/2003 | Kish et al. .................... 385/14 |

FOREIGN PATENT DOCUMENTS

| | | |
|---|---|---|
| EP | 0 991 217 A2 | 4/2000 |
| EP | 1 089 098 A1 | 4/2001 |
| WO | WO 97/49248 A1 | 12/1997 |

OTHER PUBLICATIONS

Robert D. Feldman, et al., "An Evaluation of Architectures Incorporating Wavelength Division Multiplexing for Broad-Band Fiber Access," Journal of Lightwave Technologies, vol. 16, No. 9, pp. 1546-1559 (Sep. 1998).

PCT Invitation to Pay Additional Fees for PCT Counterpart Application No. PCT/US03/12054 Containing Communication Relating to the Results of the Partial International Search, 6 pgs. (Feb. 11, 2004).

PCT Notification of Transmittal of International Search Report for PCT Counterpart Application No. PCT/US03/12054 Containing International Search Report, 9 pgs. (Mar. 31, 2004).

* cited by examiner

WAVELENGTH-DIVISION-MULTIPLEXING PASSIVE OPTICAL NETWORK UTILIZING FIBER FAULT DETECTORS AND/OR WAVELENGTH TRACKING COMPONENTS

RELATED APPLICATIONS

This application is a National Phase Application of International Application No. PCT/US2003/012054, filed Apr. 18, 2003, which claims the benefit of South Korean Patent Application entitled "Bi-directional wavelength-division-multiplexing passive optical network utilizing wavelength-locked light sources by injected incoherent light," Serial No. 2002-60868, filed Oct. 7, 2002, The present application claims priority from both applications.

FIELD

Embodiments of this invention relate to wavelength-division-multiplexing-passive-optical-networks. More particularly, an aspect of an embodiment of this invention relates to wavelength-division-multiplexing passive-optical-networks using fiber fault detectors and/or wavelength tracking components.

BACKGROUND

Some wavelength-division-multiplexing-passive-optical-networks require precise wavelength alignment between the wavelengths of the signal from a transmitter in a central office to a device in a remote site distributing that signal to a subscriber. In a passive-optical-network, a remote node containing the signal-distributing device is typically located outdoors without any electrical power supply. The transmission band of wavelengths of the outdoor signal-distributing device can change according to the variation of the external temperature. Misalignment of the wavelength between the transmitted signal and the operating wavelength of the device distributing the signal introduces extra insertion loss in the signal.

A possible way to minimize the misalignment can be to use a narrow-linewidth distributed feedback laser diode (DFB LD) that essentially always falls within the shifting bandwidths of the multiplexers as an optical transmitter to satisfy the wavelength alignment condition. However, this arrangement may not be an economic solution because of the high price of each DFB LD.

Further, in systems having two or more wavelength division multiplexers located in different areas, misalignment of the transmission band of wavelengths between the two or more wavelength division multiplexers may occur due to the temperature variations at these different areas. The operating transmission band of wavelengths of these devices can vary depending on the temperature of the device.

Complex channel selection and temperature control circuits could be employed to compensate for the large insertion loss in optical signals passing through optical multiplexer/demultiplexers located in different locations. However, the complexity of the channel selection circuit has the disadvantage that the complexity of the circuit becomes greater and greater as the number of input ports of the circuit increases. Thus, the more channels being distributed by a multiplexer/demultiplexer, then the more complex and expensive the channel selection and temperature control circuit becomes.

SUMMARY

Various methods, systems, and apparatuses are described in which a passive-optical-network includes a first multiplexer/demultiplexer, a second multiplexer/demultiplexer, a wavelength tracking component, and a transmission wavelength controller. The first multiplexer/demultiplexer is located in a first location. The second multiplexer/demultiplexer is located in a second location remote from the first location. The wavelength tracking component determines the difference between the transmission band of wavelengths of the first multiplexer/demultiplexer and the second multiplexer/demultiplexer to provide a control signal to match the transmission band of wavelengths of the first multiplexer/demultiplexer and the second multiplexer/demultiplexer. The transmission wavelength controller alters an operating parameter of the first multiplexer/demultiplexer based on the control signal to control the transmission band of wavelengths of the first multiplexer/demultiplexer.

Other features and advantages of the present invention will be apparent from the accompanying drawings and from the detailed description that follows below.

BRIEF DESCRIPTION OF THE DRAWINGS

The present invention is illustrated by example and not limitation in the figures of the accompanying drawings, in which like references indicate similar elements and in which.

DETAILED DESCRIPTION

In general, various wavelength-division-multiplexing passive-optical-network are described. For an embodiment, a passive-optical-network includes a first multiplexer/demultiplexer, a second multiplexer/demultiplexer, a wavelength tracking component, and a transmission wavelength controller. The first multiplexer/demultiplexer is located in a first location. The second multiplexer/demultiplexer is located in a second location remote from the first location such that the transmission band of wavelengths of the first and second multiplexer/demultiplexer may become mismatched due to changes in operational parameters. The wavelength tracking component, such as a detector, determines the difference between the transmission band of wavelengths of the first multiplexer/demultiplexer and the transmission band of wavelengths of the second multiplexer/demultiplexer to provide a control signal to match the transmission band of wavelengths of the first multiplexer/demultiplexer and the second multiplexer/demultiplexer. The transmission wavelength controller alters an operating parameter of the first multiplexer/demultiplexer based on the control signal to control the transmission band of wavelengths of the first multiplexer/demultiplexer. A fiber fault detector may also be in the passive optical network to detect a defect in the optical paths delivering optical signals to and from subscribers in the passive optical network.

Figure 1:
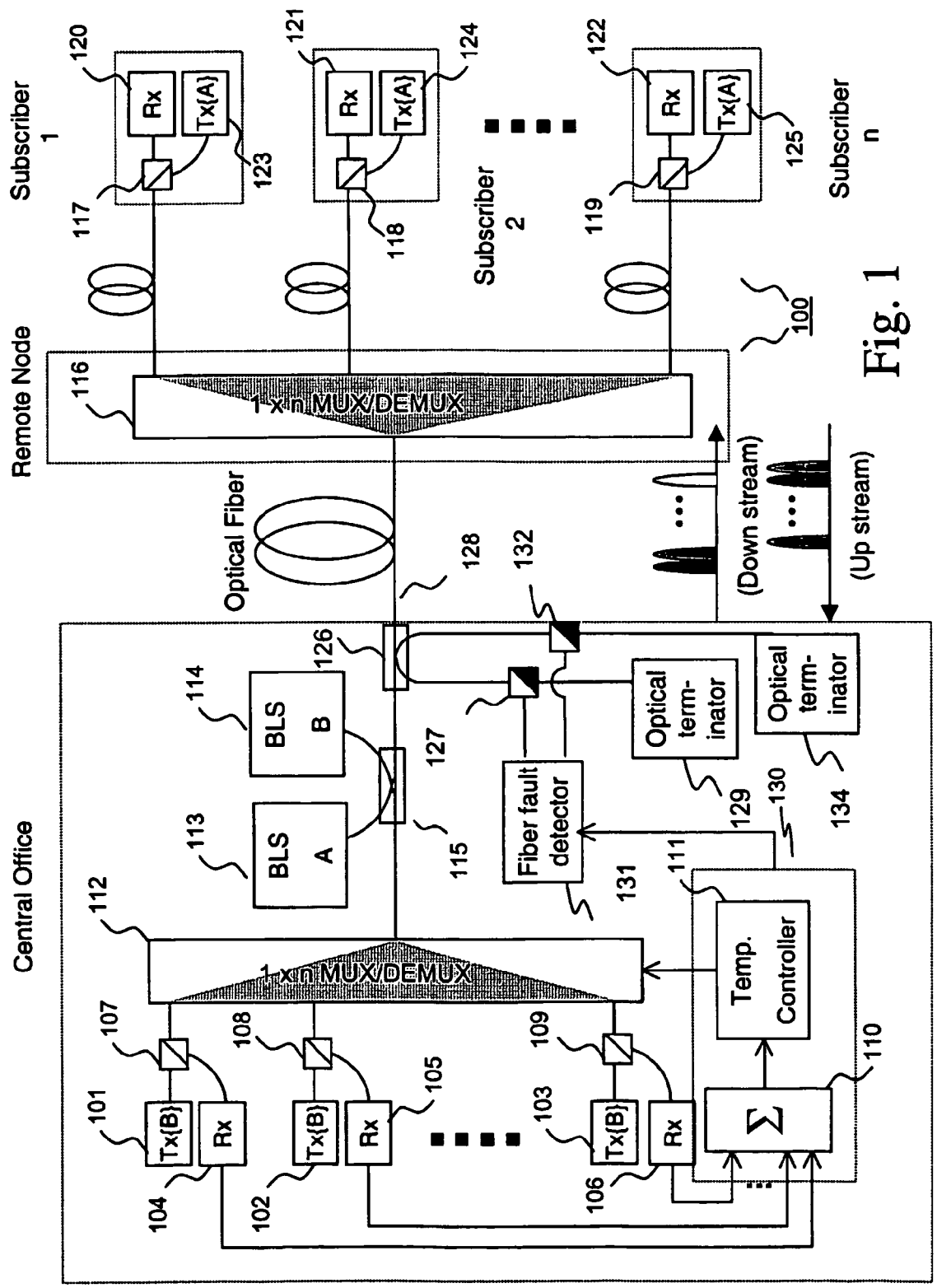
FIG. 1 illustrates a block diagram of an embodiment of a wavelength-division-multiplexing passive-optical-network using a fiber fault detector and/or wavelength tracking component.

FIG. 1 illustrates a block diagram of an embodiment of a wavelength-division-multiplexing passive-optical-network using a fiber fault detector and/or a wavelength tracking component. The wavelength-division-multiplexing passive-optical-network 100 includes a first location such as a central office, a second location remote from the first location such as a remote node, and a plurality of subscriber locations.

The example central office contains a first group of optical transmitters 101-103 emitting optical signals in a first band of wavelengths, a first group of optical receivers 104-106 to accept an optical signal in a second band of wavelengths, a first group of band splitting filters 107-109, a wavelength-tracking component 130, a first 1×n bi-directional optical multiplexer/demultiplexer 112, a first optical coupler 115, a second optical coupler 126, a fourth band splitting filter 127, a fifth band splitting filter 132, a fiber fault detector 131, a first broadband light source 114, and a second broadband light source 113.

The first optical multiplexer/demultiplexer 112 spectrally slices a first band of wavelengths received from the first broadband light source 114 and demultiplexes a second band of wavelengths received from the second optical multiplexer/demultiplexer 116. Each optical transmitter in the first group of optical transmitters 101-103 receives a discrete spectrally sliced signal in the first band of wavelengths and aligns the operating wavelength of that optical transmitter to the wavelengths within the received spectrally sliced signal.

Each optical receiver in the first group of optical receivers 104-106 receives a discrete demultiplexed signal in the second band of wavelengths. The first multiplexer/demultiplexer 112 couples to a first group of band splitting filters 107-109.

A band splitting filter, such as the first broadband splitting filter 107, splits the first band of wavelengths and the second band of wavelengths signals to different ports. Each band splitting filter 107-109 couples to a given optical transmitter in the first group of optical transmitters 101-103 and a given optical receiver in the first group of optical receivers 104-106. For example, the first band splitting filter 107 couples a spectrally sliced signal in the first band of wavelengths to the first optical transmitter 101. Thus, if the wavelength of an input optical signal is in first band of wavelengths, the output signal from the first band splitting filter 107 is passed to the port parallel to the input port. The first band splitting filter 107 couples a demultiplexed signal in the second band of wavelengths to the first optical receiver 104. Thus, in the case that the wavelength of input signal is in the second band of wavelengths, the output port is, for example, orthogonal to the input direction.

The wavelength tracking component 130 includes an electrical or optical power summing device 110 and a temperature controller 111. The power summing device 110 measures the strength of an output signal of one or more of the optical receivers 104-106 to determine the difference in the transmission band of wavelengths between the first multiplexer/demultiplexer 112 and the second multiplexer/demultiplexer 116. The temperature controller 111 controls the operating temperature of the first optical multiplexer/demultiplexer 112 to maximize the strength of the measured output signal from the optical receivers 104-106. When the transmission band of wavelengths of the first multiplexer/demultiplexer 112 and the second multiplexer/demultiplexer 116 are matched, then the strength of the measured output signal from the optical receivers 104-106 is at its maximum. The temperature controller 111 alters an operating parameter of the first multiplexer/demultiplexer, such as its temperature, based on the control signal to control the transmission band of wavelengths of the first multiplexer/demultiplexer.

If the measured output signal from the optical receivers 104-106 falls below a preset reference level, then the temperature controller 111 starts altering the operating temperature of the first optical multiplexer/demultiplexer 112 in a first direction. For example, the temperature controller 111 changes the operating temperature of the first optical multiplexer/demultiplexer 112 in a higher direction. Similarly, the temperature controller 111 could change the operating temperature of the first optical multiplexer/demultiplexer 112 in a lower direction. The temperature controller 111 measures whether the strength of the optical output signal increases. If the strength of the measured output signal increases, then the temperature controller 111 continues to incrementally increase/decrease the operating temperature of the first optical multiplexer/demultiplexer 112 until the measured output signal starts decreasing.

In an embodiment, the first multiplexer/demultiplexer 112 has a greater transmission wavelength change ratio per degree change in temperature than the second optical multiplexer/demultiplexer 116. For example, the first optical multiplexer/demultiplexer 112 may be built with a transmission wavelengths sensitivity to temperature changes ten times that of the second optical multiplexer/demultiplexer 116. Thus, if the transmission band of wavelengths of the second multiplexer/demultiplexer 116 changes because of a twenty degree temperature change, then the operating temperature of the first optical multiplexer/demultiplexer 112 needs merely to change by two degrees to match up the transmission wavelengths of the first multiplexer/demultiplexer 112 and the second multiplexer/demultiplexer 116. A benefit of increasing the sensitivity of the transmission wavelengths to temperature changes in the second multiplexer/demultiplexer 116 is that power consumption to match up the transmission band of wavelengths may be greatly reduced.

Thus, the multiplexed/demultiplexed transmission wavelength of the optical multiplexer/demultiplexers 112, 116 located in the central office and the remote node can be locked to each other. The transmission band of wavelengths locking is accomplished by tracking the demultiplexed wavelength from the remote node and then altering the transmission wavelength of the optical multiplexer/demultiplexer located in the central office. The transmission band of wavelength is altered by, for example, moving the temperature of the optical multiplexer/demultiplexer in the direction of maximizing the strength of light measured at a specific port of the optical multiplexer/demultiplexer located at the central office.

A second optical coupler 126, such as a 2×2 optical coupler, extracts a portion of input-output signals of the central office to route them to the optical fiber fault detector 131. A fourth band splitting optical filter 127 couples to the optical fiber fault detector 131 and a first optical terminator 129. A fifth band splitting optical filter 132 couples to the optical fiber fault detector 131 and a second optical terminator 134. The fiber fault detector 131 detects a defect in an optical path delivering optical signals to the subscribers.

The second optical coupler 126 injects a portion of the downstream multiplexed first band of wavelengths and the incoherent light from the second broadband light source 113 to the fifth band splitting optical filter 132. The fifth band splitting optical filter 132 routes the incoherent light in the second band of wavelengths from the second broadband light source 113 to the second optical terminator 134. The second optical terminator 134 absorbs the position of light from the second broadband light source 113. The fifth band splitting optical filter 132 routes the downstream multiplexed first band of wavelengths to the optical cable fault detection device 131.

The second optical coupler 126 routes a reflection of the downstream multiplexed first band of wavelengths and a portion of the upstream multiplexed signal in the second band of wavelengths to the fourth band splitting optical filter 127. The fourth band splitting optical filter 127 routes the upstream multiplexed signal in the second band of wavelengths to the second optical terminator 129. The second optical terminator 129 absorbs the light from upstream multiplexed signal in the second band of wavelengths. The fourth band splitting optical filter 127 routes the reflected downstream multiplexed first band of wavelengths to the optical cable fault detection device 131.

The fiber fault detector 131 compares the transmitted signal going to subscribers to a reflection of that signal. The fiber fault detector 131 compares a reference value to the ratio of the reflected signal to transmitted signal in order to determine if a fault, such as a broken optical fiber, exists in the optical path going to the subscribers. Generally, when defects do not exist in the optical path, then the optical system does not generate a reflection of the downstream multiplexed signal in the first band of wavelengths. Therefore, if a reflection of the downstream multiplexed signal in the first band of wavelengths is detected above a certain ratio, then that indicates that one or more fibers going to the subscribers is broken. The fiber fault detector 131 may compensate for extracting different percentages of the reflected signal to transmitted signal when determining the ratio of the reflected signal to transmitted signal.

The fiber fault detector 131 also receives a signal from the optical summing device 110. The fiber fault detector 131 compares the total power of the transmitted signal from the subscribers to a reference value to determine if a fault exists in the optical system. If the total power of the transmitted signal from the subscribers falls below a minimum threshold, then that indicates that one or more subscribers are no longer transmitting an optical signal back to the central office. Similarly, a degraded total power of the transmitted signal from the subscribers could indicate some other deflect such as an abnormal insertion loss in one or more optical components in the system.

The example remote node contains the second 1×n bi-directional optical multiplexer/demultiplexer 116. The second 1×n bi-directional optical multiplexer/demultiplexer 116 connects to the central office via a single optical fiber 128. The second 1×n optical multiplexer/demultiplexer 116 multiplexes and demultiplexes bi-directionally both the broadband optical signal containing the first band of wavelengths and the broadband optical signal containing the second band of wavelengths. The second 1×n optical multiplexer/demultiplexer 116 spectrally slices the second band of wavelengths from the second broadband light source 113.

Generally, multiplexing may be the combining of multiple channels of optical information into a single optical signal. Demultiplexing may be the disassembling of the single optical signal into multiple discrete signals containing a channel of optical information. Spectral slicing may be the dividing of a broad band of wavelengths into small periodic bands of wavelengths.

Each example subscriber location, for example, the first subscriber location, contains a band splitting filter 117, an optical transmitter 123 to emit optical signals in the second band of wavelengths, and an optical receiver 120 to receive optical signals in the first band of wavelengths. The second multiplexer/demultiplexer 116 to demultiplex the first band of wavelengths and spectrally slice the second band of wavelengths. The second multiplexer/demultiplexer sends these signals to each band splitting filter 117-119. The band splitting filters 117-119 function to split the input signal to an output port according to the input signal band. Each optical transmitter, such as the second optical transmitter 123, receives the spectrally sliced signal in the second band of wavelengths and aligns its operating wavelength for that optical transmitter to the wavelengths within the spectrally sliced signal. Each subscriber communicates with central office with a different spectral slice within the second band of wavelengths.

The broadband light sources 113, 114 may be natural emission light sources that generate incoherent light. A 2×2 optical coupler 115 operating in both the first band of wavelengths and the second band of wavelengths couples the first broadband light source 114 and the second broadband light source 113 to the single fiber 128. The optical power directed into the first broadband light source 114 is terminated, while the other power propagates along the optical fiber cable so that each subscriber's optical transmitter 123-125 gets the broadband of light sliced by the 1×n optical multiplexer/demultiplexer 116 at the remote node.

The first broadband light source 114, such as an amplified-spontaneous-emission source, supplies the first band of wavelengths of light to a given optical transmitter in the first group of optical transmitters 101-103 in order to wavelength lock the transmission band of wavelengths of that optical transmitter. Thus, the range of operating wavelengths for the group of transmitters 101-103 in the central office is matched to the operating wavelengths of the first multiplexer/demultiplexer 112 in the central office via the injection of these spectrally sliced signals into each of these transmitters in the first group of optical transmitters 101-103. The wavelength locking of the each optical transmitter to the particular spectral slice passed through the band splitting filter solves the large power loss on up-stream signals in the 1×n optical multiplexer/demultiplexer 112 due to the wavelength detuning depending on the temperature variation in the device at the remote node. In this way, the large power loss due to the misalignment between the wavelength of the signal from an optical transmitter 101-103 and the transmission band of wavelengths of the multiplexer/demultiplexer 112 at the central office is minimized.

Similarly, the second broadband light source 113 supplies the second band of wavelengths of light to a given optical transmitter 123-125 to wavelength lock the transmission band of wavelengths of that optical transmitter in the second group. Thus, the operating wavelengths of the second group of transmitters 123-125 in the subscriber's local is matched to the range of operating wavelengths for the second multiplexer/demultiplexer 116 via the injection of these spectrally sliced signal into each of these transmitters in the second group of optical transmitters. The wavelength locking of the each optical transmitter to the particular spectral slice passed through the band splitting filter solves the large power loss on up-stream signals in the 1×n optical multiplexer/demultiplexer 116 due to the wavelength detuning depending on the temperature variation in the device at the remote node. In this way, the large power loss due to the misalignment between the wavelength of the signal from an optical transmitter 123-125 and the transmission band of wavelengths of the multiplexer/demultiplexer 116 at the remote node is minimized.

Analogously, as described above, the wavelength-tracking component 130 matches the transmission band of wavelengths of the first multiplexer/demultiplexer 112 to the transmission band of wavelengths of a second multiplexer/demultiplexer 116. The wavelength-tracking component measures the strength of the output signal received from the optical receivers 104-106 at central office after the second band of wavelengths passes through the first multiplexer/demultiplexer 112. The wavelength-tracking component measures the strength of a particular receiver or an average output power of a group of receivers. The temperature controller 111 may vary the operating temperature of the first multiplexer/demultiplexer 112 to achieve substantially a maximum power output of the power combiner 110. The maximum power output of the power combiner 110 represents substantially the best match of transmission band of wavelengths for both multiplexer/demultiplexers 112, 116. The temperature controller 111 acts to control the transmission wavelengths of the passband for each channel of the first multiplexer/demultiplexer 112.

For an embodiment, the transmission wavelength controller to control the transmission wavelengths of the passband for each channel of the first multiplexer/demultiplexer 112 may be a strain controller, voltage controller, a temperature controller, or other similar device. The transmission wavelength controller alters an operating parameter of the first multiplexer/demultiplexer based on the control signal to control the transmission band of wavelengths of the first multiplexer/demultiplexer.

For an embodiment, an optical-passive-network consists of non-power supplied passive optical devices without any active devices between the central office and optical subscribers. The topology structure of the optical distribution network may be a star topology that has the remote node with an optical multiplexer/demultiplexer placed near the subscribers, and plays a role to relay communications with the central office through a single optical fiber and to distribute signals to and from each of the subscribers through their own optical fiber. The second multiplexer/demultiplexer may be in a remote location such that the ambient conditions differ enough from the environment of the first multiplexer/demultiplexer to substantially alter the transmission band of wavelengths of the second multiplexer/demultiplexer when matched to the transmission band of wavelengths of the first multiplexer/demultiplexer.

As discussed, the wavelength-division-multiplexing passive-optical-network 100 may use different wavelength bands in downstream signals, such as the first band of wavelengths, and up-stream signals, such as the second band of wavelengths. The down-stream signals may represent the signals from optical transmitters 101-103 in the central office to the subscribers and the up-stream signals may represent the signals from optical transmitters 123-125 in the subscribers to the central office. The wavelengths of the down-stream signals may be, for example, $\lambda 1, \lambda 2, \ldots \lambda n$ and the upstream signals would be $\lambda 1^*, \lambda 2^*, \lambda n^*$ but carried in a different band of wavelengths, where $\lambda 1$ and $\lambda 1^*$ are separated by the free spectral range of the multiplexer/demultiplexer.

As discussed, the 1×n optical multiplexer/demultiplexer 116 has the function that an optical signal from a port in the left side is demultiplexed to the n number of ports in the right side. Further, the optical signals from the n-ports in the right side are multiplexed to a port in the left side simultaneously. The 1×n optical multiplexer/demultiplexer 116 spectrally splices the second band of wavelengths into narrow spectral widths of wavelengths. Because the optical multiplexer/demultiplexer can be operated on more than two bands of wavelengths, the bi-directionally propagated up-stream signals and down-stream signals in different bands can be multiplexed and demultiplexed at the same time. Each of the bands of wavelengths operated on by the optical multiplexer/demultiplexer may be offset by one or more intervals of the free spectral range of the optical multiplexer/demultiplexer.

Each optical transmitter may be directly modulated by, for example, electrical current modulation to embed information onto the specific wavelength transmitted by that optical transmitter. For an embodiment, one or more of the optical transmitters may be a Fabry-Perot semiconductor laser that are injected with the spectrum-sliced broadband incoherent light from an amplified-spontaneous-emission light source. For an embodiment, one or more of the optical transmitters may be a wavelength-seeded reflective semiconductor optical amplifier (SOA). One or more of the optical transmitters support high bit-rate modulation and long-distance transmission. A reflective SOA may also as act as the modulation device. The optical transmitters may be modulated, wavelength locked using wavelength seeding, provide signal gain for the wavelengths within the spectral slice and increase the extinction ratio between the injected wavelengths and wavelengths outside the spectral slice.

For an embodiment, a broadband light source may be a light source based on semiconductor optical amplifiers, a light source based on rare-earth ion-doped optical fiber amplifiers, a light emitting diode, or similar device. The broadband light source may provide light with any kind of characteristic such as coherent or incoherent light.

For an embodiment, an optical multiplexer/demultiplexer can be achieved by an arrayed waveguide grating including an integrated waveguide grating, a device using thin-film filters, a diffraction grating, or similar device. The optical multiplexer/demultiplexer can also be a dielectric interference filter or similar device.

For an embodiment, wavelength tracking between multiplexer/demultiplexers minimizes the loss of a portion of a signal because of the characteristic of a multiplexer/demultiplexer to pass only wavelengths within a set channel passband. The wavelength tracking of the operating wavelengths of both of the multiplexer/demultiplexers assists in minimizing due to wavelength misalignment between these devices.

For an embodiment, the first band of wavelengths may be a standard band of wavelengths designated for telecommunications, such as the C band 1525-1560 nanometers. The second band of wavelengths may be a standard band of wavelengths designated for telecommunications that differs from the standard band of wavelengths designated for telecommunications being used by the first band of wavelengths, such as the L band 1570-1620 nanometers.

Alternatively, the second band of wavelengths may be a band of wavelengths having a spectral separation of between 5-100 nanometers apart from a peak wavelength of the first band of wavelengths. The spectral separation between the first band of wavelengths and the second band of wavelengths should be great enough to prevent the occurrence of interference between the filtered spectrally sliced downstream signal to a subscriber and the filtered upstream signal from that subscriber.

Figure 2:
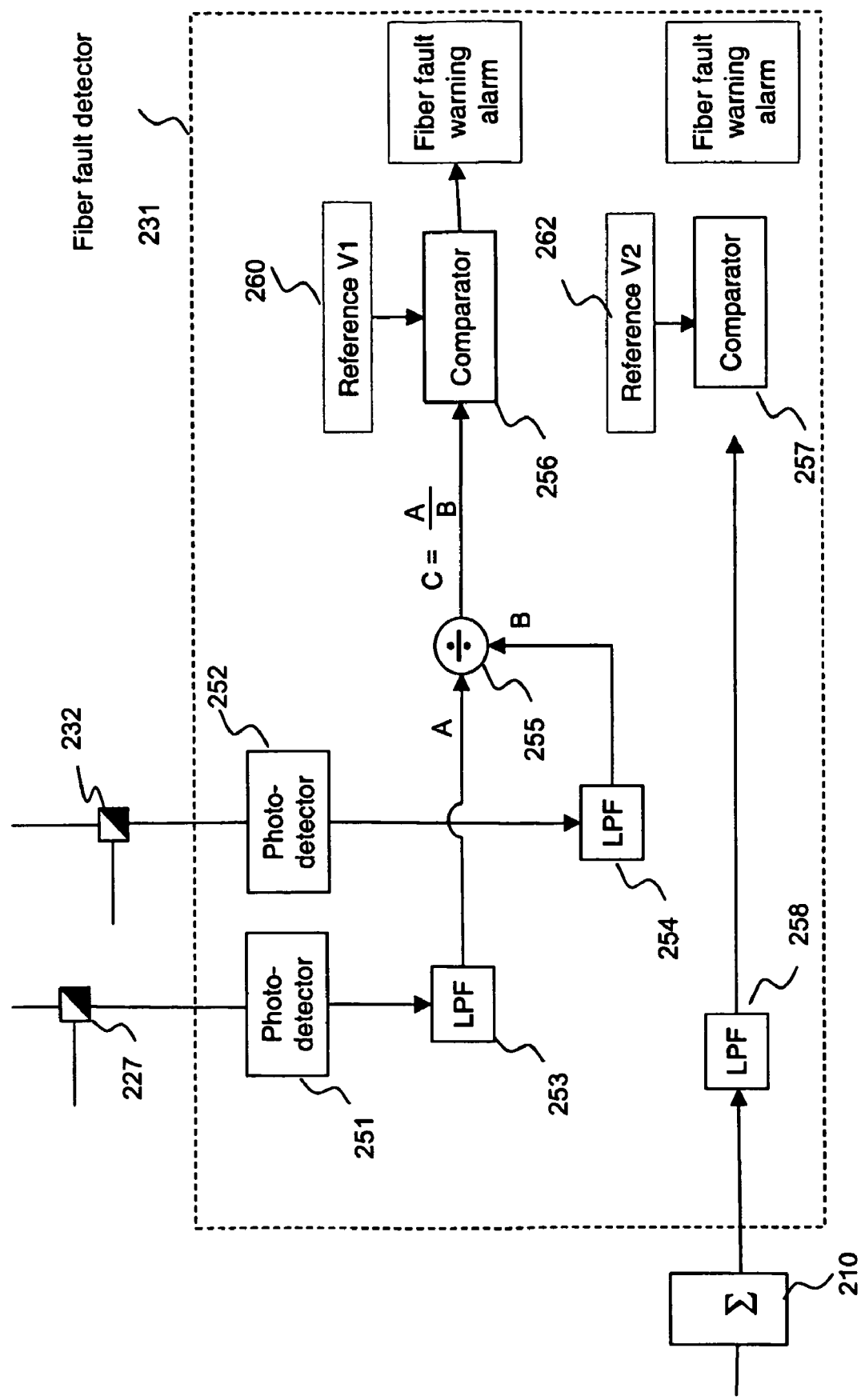
FIG. 2 illustrates a block diagram of an embodiment of a fiber fault detector.

FIG. 2 illustrates a block diagram of an embodiment of a fiber fault detector. The fiber fault detector 231 may include photo-detectors 251, 252, lowpass filters 253, 254, 258, a divider 255, and comparators 256, 257.

As described above, the N×N optical coupler (not shown), such as a 2×2 optical coupler, routes a portion of the transmitted signal going to subscribers to the fiber fault detector 231 and the same percentage portion of any reflection of that transmitted signal to the fiber fault detector 231. Band splitting filter 232 separates the portion of the transmitted signal going to subscribers from wavelengths of light not being monitored. Band splitting filter 227 separates the portion of the reflected transmitted signal coming from subscribers from wavelengths of light not being monitored. The photo-detectors 251, 252 convert the incoming optical signals into electric signals. The first photo-detector 251 converts and passes the reflection of the transmitted signal through a low pass filter 253 to the divider 255. The second photo-detector 252 converts and passes the portion of the transmitted signal through a low pass filter 254 to the divider 255.

The divider 255 divides the value of the two photo-detectors 251, 252 to check the return loss at the optical cable 128. The comparator 256 compares the output value of the divider 255 to a first reference value. The comparator 256 generates a warning signal indicating an optical cable fault with abnormal return loss if the output value of the divider 255 is higher than the reference value of V1 260.

The second comparator 257 compares the output value of the optical summer 210 to a second reference value 262. Note, the output value of the optical summer 210 is in inverse proportion to the insertion loss of the optical cable. Therefore, the second comparator 257 generates a warning signal indicating optical cable fault with abnormal insertion loss if the output value of the optical summer 210 is lower than the second reference value of V2 262.

Figure 3:
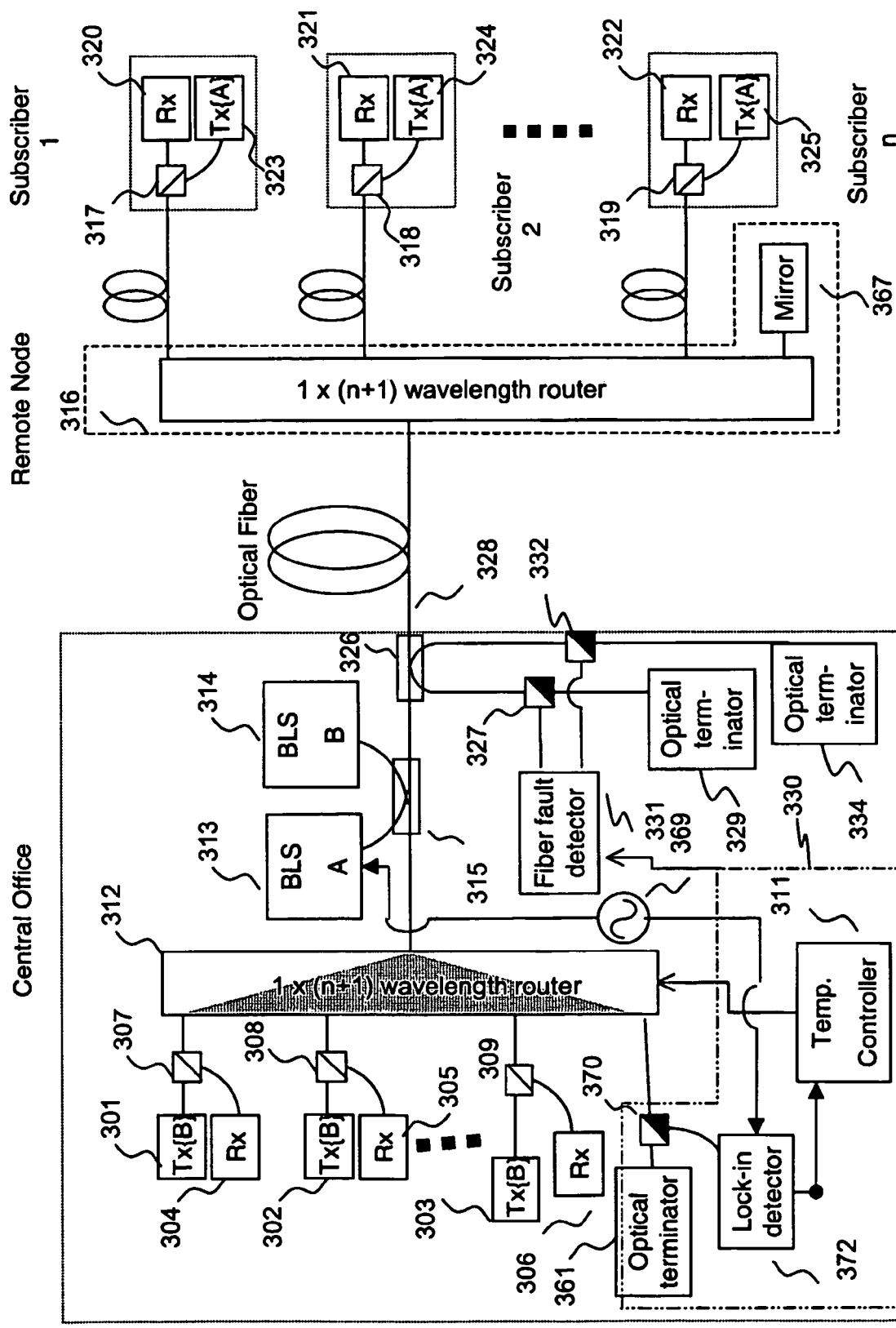
FIG. 3 illustrates a block diagram of an embodiment of a wavelength-division-multiplexing passive-optical-network using a fiber fault detector and/or wavelength tracking component.

FIG. 3 illustrates a block diagram of an embodiment of a wavelength-division-multiplexing passive-optical-network using a fiber fault detector and/or a wavelength tracking component.

The example central office contains a first group of optical transmitters 301-303 emitting optical signals in a first band of wavelengths, a first group of optical receivers 304-306 to accept an optical signal in a second band of wavelengths, a first group of band splitting filters 307-309, a wavelength-tracking component 330, a first bi-directional optical multiplexer/demultiplexer 312, a first optical coupler 315, a second optical coupler 326, a fourth band splitting filter 327, a fifth band splitting filter 332, a fiber fault detector 331, an oscillator 369, a first broadband light source 314, and a second broadband light source 313. The first bi-directional optical multiplexer/demultiplexer 312 may have as many ports as there are subscribers plus one.

The example remote node includes a second bi-directional optical multiplexer/demultiplexer 316 and a mirror 367 coupled to the second multiplexer/demultiplexer 316. The second bi-directional optical multiplexer/demultiplexer 316 may have as many ports as there are subscribers plus one.

The oscillator 369 amplitude modulates the second broadband light source 313 at a known frequency to generate a modulated second band of wavelengths. The mirror 367 reflects a portion of the second band of wavelengths, such as a spectral slice narrow band signal, to the wavelength tracking component 330. The wavelength tracking component 330 couples to the first multiplexer/demultiplexer 312 such that the reflected signal has traveled through both multiplexer/demultiplexers 312, 316. The second multiplexer/demultiplexer 316 multiplexes light reflected by the mirror 367 along with the upstream signal from the optical subscribers and it is demultiplexed by the first multiplxer/demultiplxer 312. The demultiplxed signal is inputted to the lock-in detector 372.

The wavelength tracking component 330 measures the difference in the transmission band of wavelengths between the first multiplexer/demultiplexer 312 and the second multiplexer/demultiplexer 316 based upon a change detected in the reflected portion of the modulated second band of wavelengths. The wavelength tracking component 330 may compare the known frequency and the phase of the oscillator 369 to the frequency and phase of the reflected signal to determine the temperature difference between the first multiplexer/demultiplexer 312 and the second multiplexer/demultiplexer 316.

For example, if the phase of the reflected signal has shifted forward in time than that indicates an increase occurred in the operating temperature of the temperature of the second optical multiplexer/demultiplexer 316. Accordingly, the temperature controller 311 then acts to increase the operating temperature of the first multiplexer/demultiplexer 312 to match up transmission band of wavelengths between the first multiplexer/demultiplexer 312 and the second multiplexer/demultiplexer 316.

For an embodiment, the lock-in detector 372 establishes the amplitude of the reflected modulated signal. The lock-in detector 372 compares the reflected modulated signal to a reference signal to determine when to activate the temperature controller 311. Also, the wavelength tracking between the first and second multiplexer/demultiplexers 312, 316 may be accomplished without a mirror 367. The wavelength tracking component 330 may measure the difference in the transmission band of wavelengths between the first multiplexer/demultiplexer 312 and the second multiplexer/demultiplexer 316 based upon a change detected in the transmitted signal from a subscriber derived from the modulated second band of wavelengths.

The output signal of the lock-in detector 372 is in inverse proportion to the insertion loss of a particular optical cable to a subscriber or the optical cable from the remote mode. The output signal of the lock-in detector 372 couples to the fiber fault detector 331 to detect an optical cable fault that causes abnormal insertion loss. For an embodiment, the reference values of the various reference signals may be set after all of the connections are determined to be working properly.

Figure 4A:
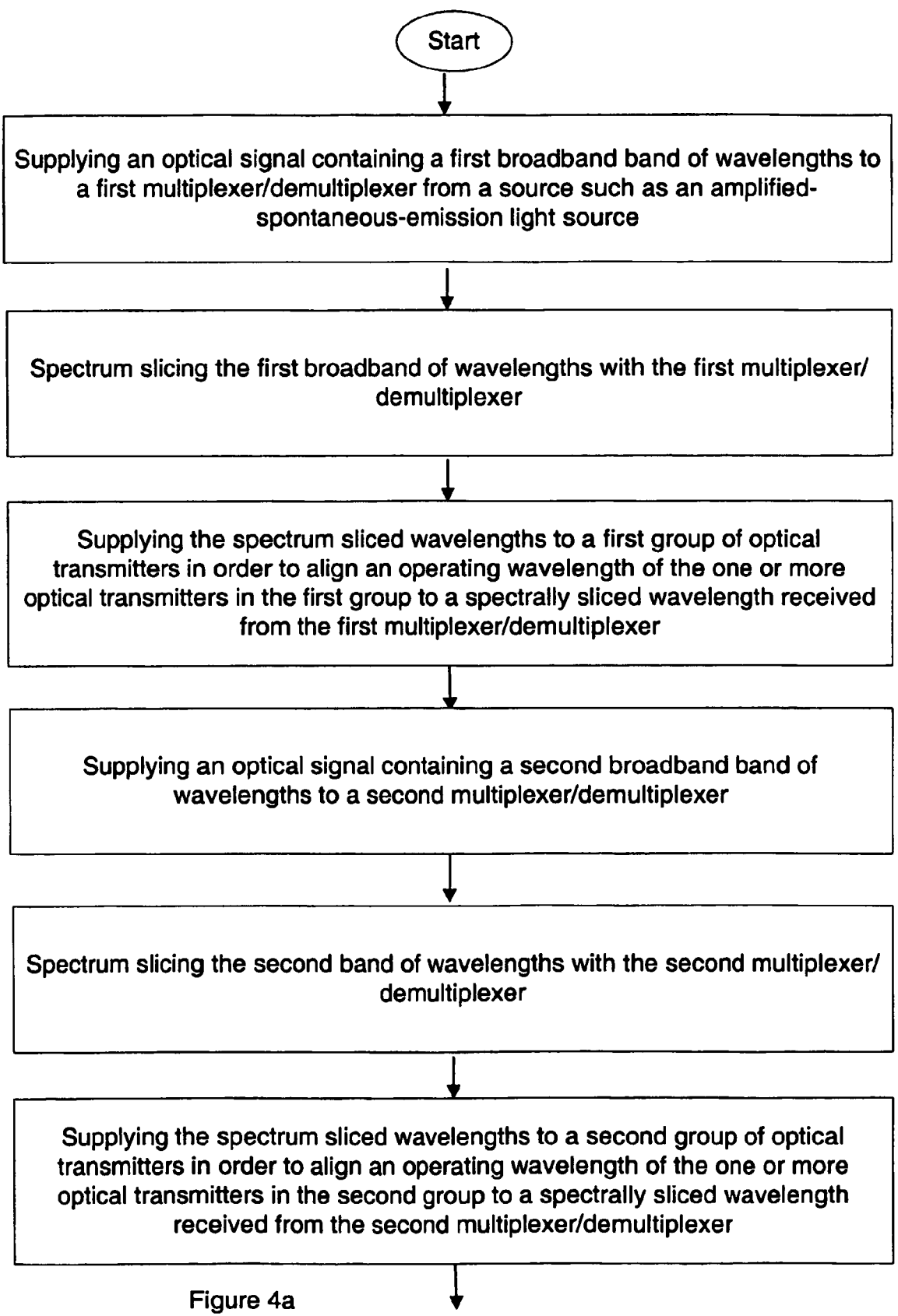
FIGS. 4a and 4b illustrate a flow diagram of an embodiment of the wavelength-division-multiplexing passive-optical-network.
Figure 4B:
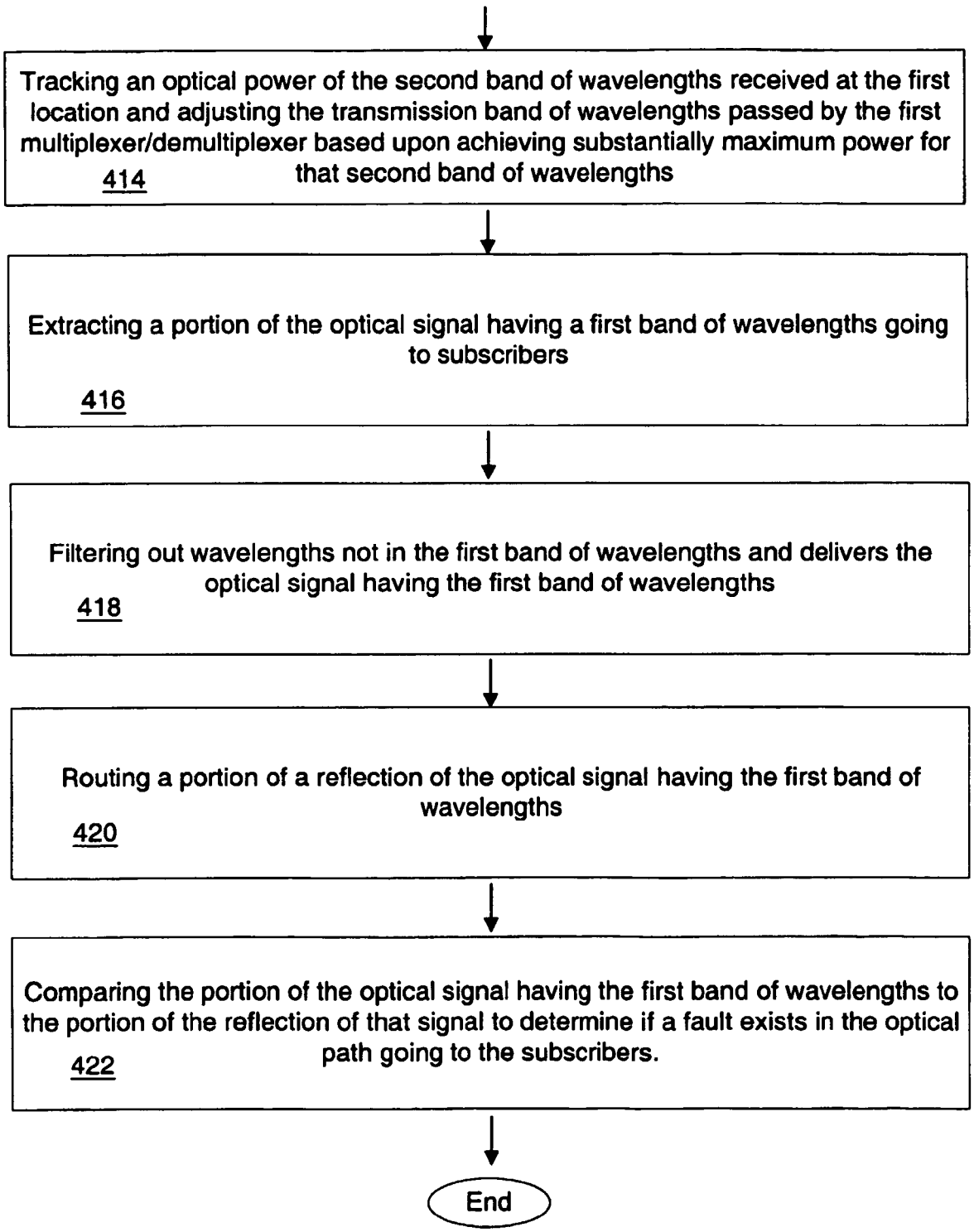

FIGS. 4a and 4b illustrate a flow diagram of an embodiment of the wavelength-division-multiplexing passive-optical-network. For an embodiment, the passive-optical-network passes upstream and down-stream signals between a first location and a second location remote from the first location.

In block 402, the passive-optical-network supplies an optical signal containing a first band of wavelengths to a first multiplexer/demultiplexer from a source such as an amplified-spontaneous-emission light source.

In block 404, the passive-optical-network spectrum slices the first broadband of wavelengths with the first multiplexer/demultiplexer.

In block 406, the passive-optical-network supplies the spectrally sliced wavelengths to a first group of optical transmitters in order to control the transmission output wavelength in the first band of wavelengths that is generated by one or more optical transmitters in the first group. Each optical transmitter self-aligns the operating wavelength of that optical transmitter to the wavelengths within a spectral slice received from the first multiplexer/demultiplexer.

For an embodiment, the transmitters in a first location, such as a supervisory node, generate the down-stream signals. The downstream signals pass through its band splitting filter. The 1×n optical multiplexer/demultiplexer in the supervisory node wavelength-division multiplexes the down stream signals. An n×n optical coupler splits those downstream signals. The signals forced into the first broadband light source are terminated, while the other signals are bound for each optical subscriber after being demultiplexed by the 1×n optical multiplexer/demultiplexer located at the remote node. At the subscriber side, the signals are passed through band splitting filters and reach the optical receivers.

In block 408, the passive-optical-network supplies a broadband optical signal containing a second band of wavelengths to a second multiplexer/demultiplexer.

In block 410, the passive-optical-network spectrally slices the second broadband of wavelengths with the second multiplexer/demultiplexer.

In block 412, the passive-optical-network supplies the spectrally sliced wavelengths to a second group of optical transmitters in order to control the transmission output wavelength in the second band of wavelengths that is generated by one or more optical transmitters in the second group. Each optical transmitter self-aligns the operating wavelength of that optical transmitter to the wavelengths within a spectral slice received from the second multiplexer/demultiplexer. The first multiplexer/demultiplexer may be located in a first location such as supervisory node and the second multiplexer/demultiplexer may be located in a second location remote from the first location, such as a remote node.

For an embodiment, the upstream-signals depart from the optical transmitters in the subscriber side, pass through band splitting filters and are multiplexed by a 1×n optical multiplexer/demultiplexer at the remote node. The n×n optical coupler splits the multiplexed signals after passing through the optical fiber cable. The upstream signals split into the second broadband light source are terminated, while the other up-stream signals continue to propagate to optical receivers at the supervisory node via a 1×n optical multiplexer/demultiplexer.

In block 414, the passive-optical-network tracks the optical power of the second band of wavelengths received at the first location after passing through the first multiplexer/demultiplexer and adjusts the transmission band of wavelengths passed by the first multiplexer/demultiplexer based upon achieving substantially maximum power for that second band of wavelengths.

In block 416, the passive-optical-network uses a n×n coupler to extract a portion of the optical signal having a first band of wavelengths going to subscribers.

In block 418, the passive-optical-network filters out wavelengths not in the first band of wavelengths and delivers the optical signal having the first band of wavelengths to a fiber fault detector.

In block 420, the passive-optical-network routs a portion of a reflection of the optical signal having the first band of wavelengths, if one exists, to the fiber fault detector.

In block 422, the passive-optical-network compares the portion of the optical signal having the first band of wavelengths to the portion of the reflection of that signal to determine if a fault exists in the optical path going to the subscribers.

Note, the specific numeric reference should not be interpreted as a literal sequential order but rather interpreted that the first band of wavelength is different than a second band of wavelengths. Thus, the specific details set forth are merely exemplary.

Some additional embodiments may include: a single device may provide the function of both the first broadband light source and the second broadband light source; the WDM PON may use more than two different bands of wavelengths; each multiplexer/demultiplexer may be an athermal arrayed waveguide grating; each receiver may compare it's the strength the received signal to a reference value and communicate with the fault detector if that received signal falls below the reference value, each multiplexer/demultiplexer may merely divide an input light signal rather than spectrally slice the input light signal; more than one remote node may exist; an optical transmitter may be operated continuous wave and modulated by an external modulator, etc.

In the forgoing specification, the invention has been described with reference to specific exemplary embodiments thereof. It will, however, be evident that various modifications and changes may be made thereto without departing from the broader spirit and scope of the invention as set fourth in the appended claims. The specification and drawings are, accordingly, to be regarded in an illustration rather then a restrictive sense.

We claim:

1. An apparatus comprising:
  a wavelength tracking component to determine a difference between transmission band of wavelengths of a first multiplexer/demultiplexer and a second multiplexer/demultiplexer in order to provide a control signal to match the transmission band of wavelengths of the first multiplexer/demultiplexer and the second multiplexer/demultiplexer, wherein the first multiplexer/demultiplexer is located in a first location and the second multiplexer/demultiplexer is located in a second location remote from the first location, wherein the first multiplexer/demultiplexer receives a first optical signal containing a first band of wavelengths; the second multiplexer/demultiplexer receives a second optical signal containing a second band of wavelengths; and wherein the wavelength tracking component determines the difference based on measuring an optical power of a third optical signal containing the second band of wavelengths after passing through the first multiplexer/demultiplexer; and
  a transmission wavelength controller to alter an operational parameter of the first multiplexer/demultiplexer based on the control signal to control the transmission band of wavelengths of the first multiplexer/demultiplexer.

2. The apparatus of claim 1, wherein the wavelength tracking component further comprises:
  a lock-in detector coupled to the first multiplexer/demultiplexer and an oscillator.

3. The apparatus of claim 2, wherein the wavelength tracking component further comprises:
  a power summing device to measure a strength of an output signal from one or more optical receivers, wherein the power summing device electrically couples to the temperature controller; and
  the temperature controller alters the operating temperature of the first multiplexer/demultiplexer to achieve substantially a maximum power output from the power summing device.

4. The apparatus of claim 3, wherein the power summing device is an electrical power summing device.

5. The apparatus of claim 1, wherein the transmission wavelength controller comprises a temperature controller to alter an operating temperature of the first multiplexer/demultiplexer based on the control signal.

6. The apparatus of claim 5, wherein the temperature controller dithers the operating temperature of the first multiplexer/demultiplexer in a first direction and then measures whether a strength of the control signal changes, and adjusts the operating temperature of the first multiplexer/demultiplexer based upon the detected change.

7. A passive optical network, comprising:
  a first multiplexer/demultiplexer located in a first location;
  a second multiplexer/demultiplexer located in a second location remote from the first location;
  a wavelength tracking component that determines a difference between the transmission band of wavelengths of the first multiplexer/demultiplexer and the second multiplexer/demultiplexer to provide a control signal, wherein the wavelength tracking component couples to a port of the first multiplexer/demultiplexer;

a transmission wavelength controller to alter an operational parameter of the first multiplexer/demultiplexer based on the control signal to control the transmission band of wavelengths of the first multiplexer/demultiplexer:

a first broadband light source to supply the first optical signal containing the first band of wavelengths to the first multiplexer/demultiplexer:

a second broadband light source to supply the second optical signal containing the second band of wavelengths to the second multiplexer/demultiplexer, and an oscillator to modulate the second broadband light source at a known frequency to generate a modulated second band of wavelengths.

8. The passive optical network of claim 7 further comprising:
a mirror coupled to the second multiplexer/demultiplexer to reflect a portion of the modulated second band of wavelengths to the wavelength tracking component.

9. The passive optical network of claim 8, wherein the wavelength tracking component measures a difference in the transmission band of wavelengths between the first multiplexer/demultiplexer and the second multiplexer/demultiplexer based upon a change detected in the reflected portion of the modulated second band of wavelengths.

10. The passive optical network of claim 8, wherein the wavelength tracking component further comprises:
a lock-in detector to establish an amplitude of the reflected modulated signal by comparing the reflected modulated signal to a reference signal.

11. The passive optical network of claim 7 wherein the wavelength tracking component compares the known frequency and phase of a signal from the oscillator to the frequency and phase of a reflected signal to determine a temperature difference between the first multiplexer/demultiplexer and the second multiplexer/demultiplexer.

12. The passive optical network of claim 7 wherein the wavelength tracking component measures a difference in transmission band of wavelengths between the first multiplexer/demultiplexer and the second multiplexer/demultiplexer based upon a change detected in a transmitted signal from one or more subscribers, wherein the transmitted signal is derived from the modulated second band of wavelengths.

13. The passive optical network of claim 7, further comprising:
a first group of optical transmitters to emit optical signals in a first band of wavelengths;
a first group of optical receivers to accept optical signals in a second band of wavelengths, wherein the first group of optical transmitters and the first group of optical receivers couple to the first multiplexer/demultiplexer by a first group of band splitting filters;
a second group of optical transmitters to emit optical signals in the second band of wavelengths; and
a second group of optical receivers to accept optical signals in the first band of wavelengths, wherein the second group of optical transmitters and the second group of optical receivers couple to the second multiplexer/demultiplexer by a second group of band splitting filters.

14. The passive optical network of claim 13, further comprising:
a first optical transmitter in the second group of optical transmitters, wherein the second multiplexer/demultiplexer spectrally slices the second band of wavelengths to lock an output wavelength of the first optical transmitter to within the bandwidth of the spectral slice.

15. The passive optical network of claim 7, wherein the transmission wavelength controller comprises a temperature controller to alter an operating temperature of the first multiplexer/demultiplexer based on the control signal.

16. The passive optical network of claim 15, wherein the first multiplexer/demultiplexer has a greater transmission wavelength change ratio per degree change in temperature than the second optical multiplexer/demultiplexer.

17. The passive optical network of claim 7, further comprising:
a fiber fault detector to detect a defect in optical paths delivering optical signals to and from in the passive optical network.

18. A passive optical network, comprising:
a first broadband light source to generate an optical signal having a first band of wavelengths;
an optical multiplexer/demultiplexer to multiplex the optical signal having the first band of wavelengths to a plurality of subscribers; and
a fiber fault detector to detect a fault in an optical path to the subscribers, wherein the fiber fault detector compares the optical signal having the first band of wavelengths going to the subscribers to a reflection of that signal; and
an optical coupler operating in both the first band of wavelengths and a second band of wavelengths, the optical coupler to route at least a portion of the optical signal having the first band of wavelengths and at least a portion of the reflection of that signal to the fiber fault detector.

19. The passive optical network of claim 18, further comprising:
an optical band splitting filter coupled to the fiber fault detector as well as an optical terminator.

20. The passive optical network of claim 18, wherein the fiber fault detector includes a photo-detector, a low pass filter, a divider, and a comparator.

21. The passive optical network of claim 18, wherein the fiber fault detector compares a ratio of the reflected signal to the optical signal with a reference value to determine if the fault exists in the optical path going to the subscribers.

22. The passive optical network of claim 19, wherein the fiber fault detector compares total power of a transmitted signal from the subscribers to a reference value to determine if the fault exists in the optical path to and from the subscribers.

23. The passive optical network of claim 18, further comprising
a plurality of receivers to receive a signal from the subscribers; wherein each receiver may compare the strength the received signal to a reference value and communicate with the fiber fault detector if that received signal falls below the reference value.

24. The passive optical network of claim 18, further comprising:
a second optical multiplexer/demultiplexer to multiplex and demultiplex bi-directionally.

25. The passive optical network of claim 24, further comprising:
a wavelength tracking component having a power combiner to measure total power of a transmitted signal from the subscribers after passing through the second optical multiplexer/demultiplexer; and
a temperature controller to control an operating temperature of the second optical multiplexer/demultiplexer to maximize the output power of the power combiner.

26. The passive optical network of claim 18, wherein the optical multiplexer/demultiplexer is an athermal arrayed waveguide grating.

27. The passive optical network of claim 18, wherein the optical multiplexer/demultiplexer is an arrayed waveguide grating.

28. A method, comprising:
supplying an optical signal containing a first band of wavelengths to a first multiplexer/demultiplexer in a passive optical network;
supplying an optical signal containing a second band of wavelengths to a second multiplexer/demultiplexer in the passive optical network;
measuring an optical power of the second band of wavelengths after passing through the first multiplexer/demultiplexer; and
adjusting a transmission band of wavelengths passed by the first multiplexer/demultiplexer based upon achieving substantially maximum power for the measured optical power of the second band of wavelengths.

29. An apparatus, comprising:
means for supplying an optical signal containing a first band of wavelengths to a first multiplexer/demultiplexer in a passive optical network;
means for supplying an optical signal containing a second band of wavelengths to a second multiplexer/demultiplexer in the passive optical network;
means for measuring an optical power of the second band of wavelengths after passing through the first multiplexer/demultiplexer; and
means for adjusting a transmission band of wavelengths passed by the first multiplexer/demultiplexer based upon achieving substantially maximum power for the measured optical power of the second band of wavelengths.

30. A method, comprising
extracting at least a portion of an optical signal having a first band of wavelengths going to subscribers in a passive optical network;
filtering out wavelengths not in the first band of wavelengths; routing at least a portion of a reflection of the optical signal having the first band of wavelengths; and
comparing the portion of the optical signal having the first band of wavelengths to the portion of the reflection of that signal to determine if a fault exists in an optical path going to the subscribers.

31. An apparatus, comprising:
means for extracting at least a portion of an optical signal having a first band of wavelengths going to subscribers in a passive optical network;
means for filtering out wavelengths not in the first band of wavelengths;
means for routing at least a portion of a reflection of the optical signal having the first band of wavelengths; and
means for comparing the portion of the optical signal having the first band of wavelengths to the portion of the reflection of that signal to determine if a fault exists in an optical path going to the subscribers.

* * * * *